Dec. 4, 1945.  F. J. SIGMUND ET AL  2,390,130
COOLING MEANS FOR DYNAMO-ELECTRIC MACHINE
Filed June 4, 1943  2 Sheets-Sheet 1
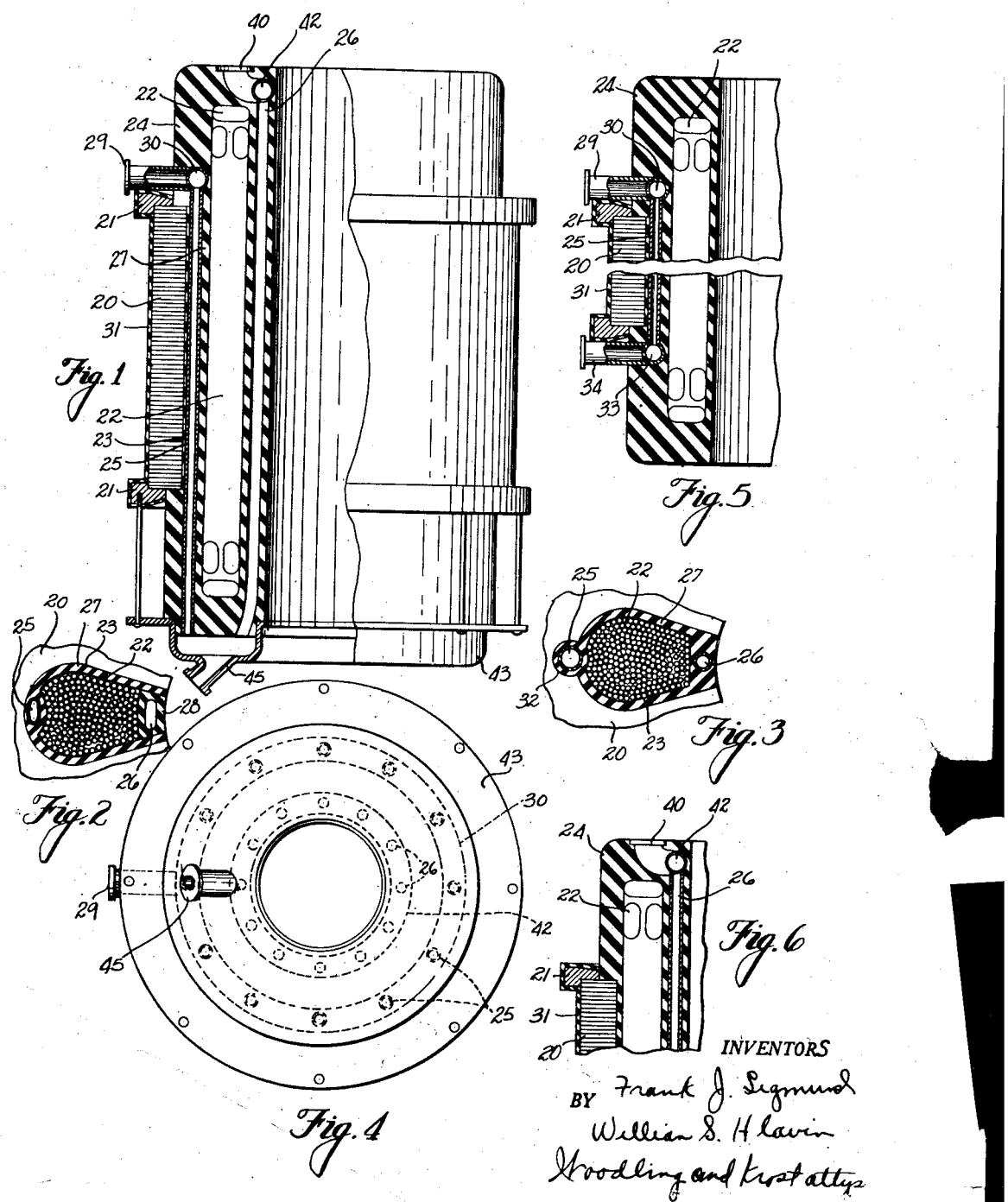
INVENTORS
Frank J. Sigmund
William S. Hlavin
BY Woodling and Krost attys Dec. 4, 1945.  F. J. SIGMUND ET AL  2,390,130
COOLING MEANS FOR DYNAMO-ELECTRIC MACHINE
Filed June 4, 1943  2 Sheets-Sheet 2
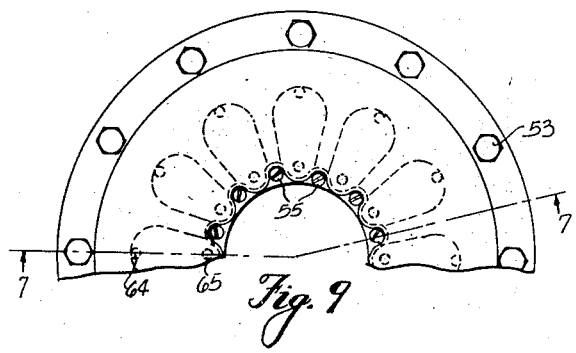
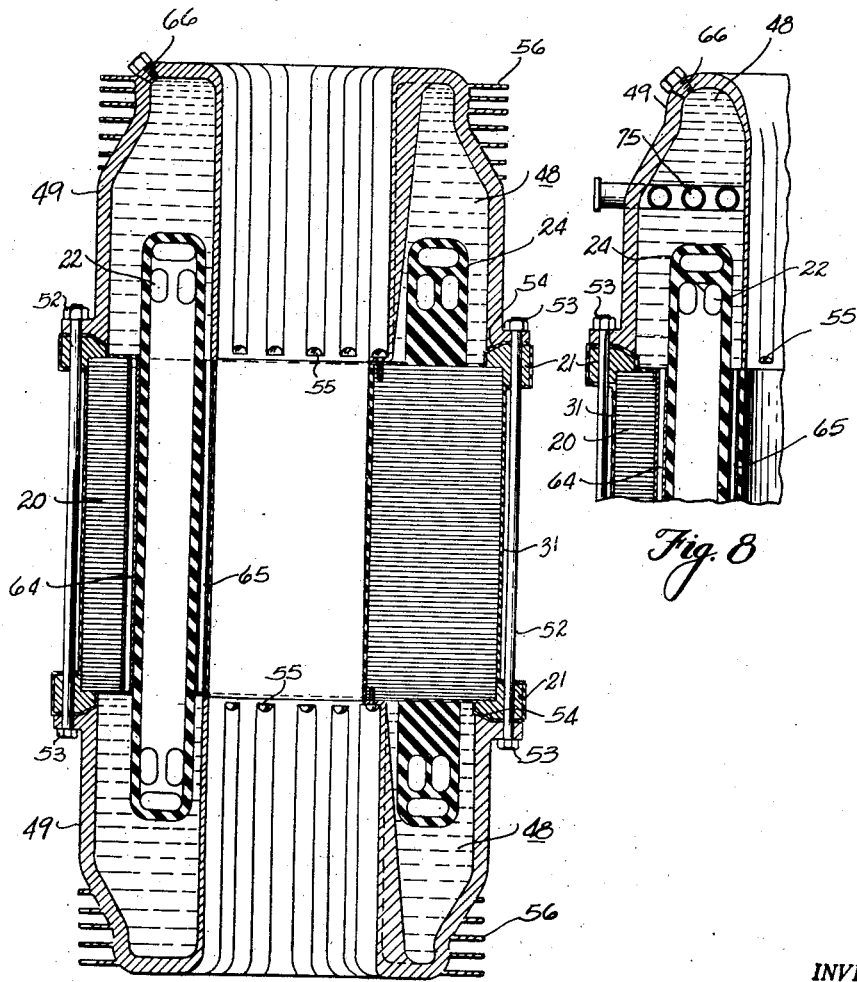
INVENTORS
Frank J. Sigmund
BY William S. Hlavin
Hoodling and Kroot attys Patented Dec. 4, 1945

2,390,130

UNITED STATES PATENT OFFICE 2,390,130

COOLING MEANS FOR DYNAMOELECTRIC MACHINES

Frank J. Sigmund and William S. Hlavin, Cleveland, Ohio, assignors, by mesne assignments, to Sigmund Corporation, a corporation of Ohio Application June 4, 1943, Serial No. 489,615

4 Claims. (Cl. 171—252)

Our invention relates in general to the improvement of dynamo-electric machines, and more especially to the windings of the dynamo-electric machines with the provision for a special means of reducing their temperature during their operation.

The trend of the development of the dynamo-electric machines has been to increase the speed and to decrease the overall dimensions and weight, thus steadily exposing the construction to higher requirements and necessitating the machine to function under conditions of higher temperature. This causes many difficulties, especially as the insulation of the winding is exposed to higher temperatures than are advisable for the durability and reliance of the dynamo-electric machines. A great difficulty exists, especially in keeping the temperature of the wires at the level at which optimum efficiency and optimum endurance can be secured.

Different means have been employed of late for the improvement and reduction of the operating temperature of the dynamo-electric machines. In some cases, the stator core was divided so that the core portions were built up in segments and spaced in axial directions from each other in order to provide a plurality of ventilating ducts or channels between the groups through which air is passed. The disadvantage of this method is evident, as the air is not an adequate medium for heat transfer and further the air does not come in direct contact with the windings.

Other types of construction included the cooling "pipe system" which comprised pipes or tubes with circulating liquid therein placed between the lamination thus tending to accelerate the cooling. The inadequacy of this method is evident. The cooling "pipe system" actually contacts the lamination core only with a small portion of the pipe surface, forming an air-cushion between the cooling pipe and the laminae so that the insulation created by the cushion of air between the pipe and laminae very largely decreases the cooling effect of the water. The favorable effect and advantage of water-cooling over the other already known means is a well established fact and numerous constructions have employed means of cooling the lamination core by means of metal channels or ducts. The disadvantage was that corrosion occurred in these metal channels or ducts. Also hard water deposits scale materially affected the efficiency of the cooling system of the dynamo-electric machines, and frequent de-scaling was necessary, even in soft-water areas. The disadvantage of this method makes the use of water cooling impractical.

In some cases, especially in the bigger dynamo-electric machines hydrogen cooling has been employed. This method is rather expensive, calling for complicated arrangements, and cannot be employed in the small dynamo-electric machines. Besides that, none of the before described methods materially improved the actual operating or temperature condition of the windings in the dynamo-electric machines, as we shall show. We have found that the lamination core with the windings exposed to room temperature of about 37° C. and magnetized, would disclose the following conditions after a period of three (3) hours of full-load operation or tests, in which period an equilibrium is reached:

| | ° C. |
|---|---|
| Temperature of stator (iron surface) | 63.3 |
| Temperature of the insulation lining | 76.2 |
| Temperature of copper wire windings | 110 |

The main difficulty, the high temperature of the windings during the operation of the dynamo-electric machines, could be changed only partially by employing the prior art method of cooling as the cooling effect is slowed down by different obstacles, such as by the layers of the air between the sleeves in the slots and the lamination core and the sleeves and windings; by the heat resistance of the insulation material forming the sleeves in the slots; by the air cushions between the individual wires and the heat resistance of different varnishes, and further by the air trapped between the individual wires which hardly can be removed by the orthodox method of varnishing.

The prior art cooling was employed in the lamination core, as this possessed the largest surface and therefore also the best heat transfer possibilities. The winding elements, on the other hand, which have a relatively small surface for the radiation of the heat and which were the hottest spots, were not directly cooled.

It is the object of our invention to obviate all of the hereinabove mentioned defects.

A more specific objective of our invention is to provide means for the amelioration of the heat transfer between the different components or elements of the dynamo-electric machines, and especially reduce the temperature in the dynamo-electric machines.

Another object of our invention is to provide a means of reducing the temperature of the windings in the dynamo-electric machines and to increase the efficiency of the cooling, and so also increase the output of and efficiency of the dynamo-electric machines.

There is the further object of our invention to create the ducts contacting the windings and circulating the cooling liquid through the ducts.

A further object of our invention is to close the slot openings with bridges having the ducts through which the cooling liquid flows, reducing the heat transmitted to the rotor hole, and influencing the cooling of the rotor windings.

Another object of our invention is to completely seal the windings of the dynamo-electric machines in a water-tight insulating envelope in combination with a cooling means provided therewith.

A further object of the invention is to provide cooling compartments; these compartments built over the water-tight sealed windings and provided with means for indirect cooling of the cooling medium.

A still further object of our invention is the provision of sealing the windings with a water-tight rubber-like material, the rubber-like material being elastic, thus able to take the expansion of the cooling liquid.

There is still another object of the invention, and that is the provision of suitable communicating channels to serve the purpose of circulating the cooling liquid.

Other objects and a fuller understanding of our invention may be had by referring to the following description and claims taken in conjunction with the accompanying drawings in which:

Figure 1 shows a view partly shown in cross-section of a stator assembly embodying the features of our invention;

Figure 2 is a cross-sectional view of the slot, illustrating the cooling circuits according to our invention;

Figure 3 shows an arrangement similar to Figure 2 with the lamination slot somewhat enlarged for the cooling circuits;

Figure 4 is an end view illustrating the inlet header pipes of our cooling arrangement;

Figure 5 is a fragmentary cross-sectional view illustrating another example of the cooling arrangement;

Figure 6 shows an arrangement similar to Figure 5;

Figure 7 and Figure 9 are modified views illustrating a water-tight compartment around the coil heads; and Figure 8 is a fragmentary cross-sectional view of Figure 7 showing heat exchangers assembled in a water compartment.

Figure 1 is a cross-sectional view of the stator assembly. The lamination core 20 comprises a plurality of laminae having securing rings 21 and coils 22 inserted into the slots 23. The coils are completely imbedded in the rubber-like envelope 24, this renders the coils completely waterproof. In our invention, the rubber-like material includes a variety of substances in which the predominating resinous component may comprise polymers of vinyl compounds, such as vinyl chloride, vinyl acetate, vinyl acetals and alcohols, and vinylidene chloride. It may further include mixtures and copolymers of the vinyl compounds either with or without substantial amounts of plasticizers usable with these resins. Natural rubber or synthetic rubber may be employed.

We find that the compounds identified above give very good results, however, we do not want to be specifically confined to these compounds as our invention contemplates the use of any rubber-like material of synthetic rubber-like compound with distinctive qualities which make that compound the most suitable for the insulation such as: (1) low water absorption, (2) high electrical resistance, (3) great resistance to chemicals including acids, alkalies, corrosives and gases, (4) good tensile strength and (5) easy to apply to the magnetizable core.

The softening point of the rubber-like material should be as high as possible, thus permitting the temperature of the motor to rise to a high value. The rubber-like plastics or their compounds have a wide range of temperature resistance and point of softening. Some begin to soften at 140° F. or more. Other grades can be employed with a softening temperature higher than 200° F. and do not become brittle at sub-zero temperatures and which have high dielectric and high tensile strengths. The rubber-like material is somewhat elastic and could be employed to the core 20 producing a coating 26 and slot sleeves 27, in the way described in our previous patent applications, for instance in application No. 482,170, filed April 12, 1943, for Magnetizable core, and application No. 485,020, filed April 29, 1943, for Water-proof winding element.

Slot cooling tubes 25 which may be made of metal coated with rubber-like material are inserted in the slots 23, the inlet ends of which tubes are sealed to a peripheral conduit head 30 having an inlet 29. The coating of the tube may be formed either by dipping or by arranging the rubber-like sleeves over the outer surface of the tube. This reduces the possibility of leakage of the cooling medium, which may be any inert fluid, conducting or dielectric, such as water, oil, gases, which can be forced or circulated by suitable means of a pump or attached to the source of the cooling medium. After the winding is completed, tubes 26 are positioned in the slots, the inlet ends of which tubes are sealed or attached with suitable mechanical means to the peripherial conduit head 42. The peripherial conduit head 42 has an inlet 40 for the cooling liquid. The outlet ends of the cooling tubes 25 and 26 terminate in a peripherial outlet head 43; this peripherial outlet head has an outlet pipe connection 45, for the warm liquid which has absorbed the excessive heat of the winding.

The outlet pipe 45 may be connected with some means for utilizing that heated liquid, especially when water has been used as the cooling medium. Such water may be used for feeding boilers, or for other suitable purposes. For the purpose of clarity these means of economizing the heated liquid are not pictured in our accompanying drawings.

In some cases, for instance, where the dynamo-electric machines are installed in relatively small rooms with difficult ventilation, we may cover the outer surface of the stator 20 with a coating 31 of a desirable thickness of the rubber-like insulating material, so that the radiation of the lamination core would be partly or completely eliminated, depending upon the thickness of the insulation. In such a case the cooling means employed would be calculated and in some way the capacity of the cooling system would be increased to take away the portion of the heat which would otherwise be radiated through the lamination core.

Figure 2 is the cross-sectional view of the slot with one type of tubing. The tubes 25 may be in the bottom of the slots and the tubes 26 in between the lamination teeth formed in the rubber-like material bridging the teeth. The tubes 26 are preferably built of non-magnetizable material and may comprise rubber-like sleeve wedges 28 which are wedged in the slots throughout the entire length of the core and beyond.

The inlet pipes 29 and 40 are connected with any suitable source of supply of the cooling medium such as a circulating pump or water supply system. The outlet pipe 45 may be connected with any convenient reservoir, or boiler for warm water, thus offering the possibility of utilizing the heat radiated in the winding of the dynamo-electric machines and transferred into the cooling system according to our invention in the suitable way.

The liquid flowing through the cooling pipes 25 and 26 in the slots is in intimate contact with the winding elements. The liquid-cooling medium having immediate contact with the winding elements decreases the temperature of the winding, as well as within the rotor hole, thus decreasing the losses in the rotor, and increasing the efficiency, and extending the life of the dynamo-electric machine.

The velocity of the cooling medium, could be regulated, depending upon the need of keeping the temperature at any required level. The direction of the flow of the cooling medium and the location of the parts of the cooling system could be such that the coldest water is in contact with the hottest part of the dynamo-electric machine and the warmer water is in contact with the parts of lower temperature.

In Figure 2, the cooling tubes 25 and 26 could be of any suitable shape, for instance oval-shaped, as in Figure 2, and can be inserted in any suitable place in the slot of the dynamo-electric machine. They may be inserted between the two coils as separators, in the slots. Sometimes it may be preferable to use more than one type of cooling tube in the slots without deviation from our invention.

The reduction of the winding space is more than balanced out as the cooling employed, according to our invention, reduces the losses and admits the higher loading of the conductors, thus permitting a reduction of the copper in the winding elements.

Figure 3 pictures a similar arrangement to that in Figure 2, showing the lamination slot 23 with the supplementary space 32 for the cooling elements. This supplementary space cut in the outwardly extended part of the slots is so arranged that the density of the magnetic flux is not disturbed, as in that portion of the laminae, the density of the magnetic flux is lower. The overcrowding of magnetic flux does not occur to any degree. In Figure 3, the tubes 26 may be inserted in the slots after which rubber-like material may be applied to fill the slot and hold the tubes therein.

As shown in Figure 5, the inlet pipe 29 and the pipe 25 can be arranged in such a way so that the pipes may be connected to a bottom header 33 having an outlet 34, without deviation from our invention. In Figure 5, only one tube is employed in each slot. Figure 6 is similar to Figure 5. In Figure 6, the tubes 26 are arranged in a way so that the cooling liquid is forced through the peripheral inlet pipe 40 over the heads of the coils, and through the cooling tubes 26 between the lamination teeth, and then out through the discharge.

Figure 7 is a cross-sectional view of another form of the dynamo-electric machine. Figure 9 is an end view of Figure 7. The envelope 24 which covers the coil heads is elastic. On the ends of the rubber-like envelope 24, and if space is available around the side walls of the envelope, the water-tight compartments 48 are developed, comprising two helmets 49 which may be metallic or plastic, formed or molded, are attached with bolts 52 and nuts 53 to the securing rings 21. Between the rings 21 and the helmets are rubber-like gaskets 54. Screws 55 secure the inner peripheral edge of the helmets firmly to the rubber-like envelope 24. In that way the inner part, facing the rotor hole, as well as the outer part of the helmets is secured and no leakage of the cooling medium can occur. The helmets 49, forming the water-tight compartment are provided with cooling ribs 56, permitting quicker heat exchange. Tubes 64 and 65 extend through the slots. Liquid may be supplied to the compartments through a tapped opening 66.

Figure 8 shows a modified arrangement, in that a heat exchanger 75 is located in the cooling compartment 48 to extract heat from the liquid in the compartment. The heat exchanger could be arranged in the bottom as well as in the top part of the dynamo-electric machine.

The cooling tubes 64 and 65 as well as the separators of the windings are installed in a similar manner as described in Figure 1. They are inserted or introduced into the slots, and their function is similar to that described in previous sections of this patent application. The ends of these cooling elements are not connected together, but are free, having the outlet directly in the compartment. The cooling liquid is filled in the compartment through the filling hole 66 and closed by the screw.

During the operation of the dynamo-electric machines, the liquid expands, and the rubber-like material which is somewhat elastic, takes care of the expansion.

The cleaning of the cooling elements in Figure 7 or 8, if necessary, is relatively easy, as no sharp edges or curves occur in the cooling conduits 64 and 65, and thus a tool may be readily passed therethrough for removing any deposits or foreign matter.

When a hydraulic pump is attached with an electro-motor, the cold water from the well may be forced through the heat exchanger 75 or many other suitable cooling fluids may be employed without deviating from our invention.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. In a dynamo-electric machine having a magnetizable lamination core provided with a plurality of teeth and slots therebetween, a winding comprising coils with coil sides in said slots and coil heads at the ends of the core, a mass of insulating material in the slots and bridging the space between the teeth comprising a liquid proof container about each coil side, said mass of insulating material terminating in an annular ring upon each end of the core and comprising a liquid proof container about the coil heads, said mass of insulating material having duct cooling means therein, said cooling means including a plurality of longitudinal passages through the mass of insulating material.

2. In a dynamo-electric machine having a magnetizable lamination core provided with a plurality of teeth and slots therebetween, a winding comprising coils with coil sides in said slots and coil heads at the ends of the core, a mass of insulating material in the slots and bridging the space between the teeth comprising a liquid proof container about each coil side, said mass of insulating material terminating in an annular ring upon each end of the core and comprising a liquid proof container about the coil heads, said mass of insulating material having duct cooling means therein, said cooling means including a plurality of longitudinal passages through the mass of insulating material in the space bridging the teeth, and intercommunicating means on each end of the core for interconnecting the ends of the said passages.

3. In a dynamo-electric machine having a magnetizable lamination core provided with a plurality of teeth and slots therebetween a winding comprising coils with coil sides in said slots and coil heads at the ends of the core, a mass of insulating material in the slots and bridging the space between the teeth comprising a liquid proof container about each coil side, said mass of insulating material terminating in an annular ring upon each end of the core and comprising a liquid proof container about the coil heads, said mass of insulating material having duct cooling means therein, said cooling means including a plurality of longitudinal passages through the mass of insulating material in the space bridging the teeth, and intercommunicating means on each end of the core for interconnecting the ends of the said passages, said intercommunicating means comprising a first and a second compartment mounted respectively on each end of the core with the mass of insulating material about the coil heads extending into said compartments.

4. In a dynamo-electric machine having a magnetizable lamination core provided with a plurality of teeth and slots therebetween, a winding comprising coils with coil sides in said slots and coil heads at the ends of the core, a mass of insulating material in the slots and bridging the space between the teeth comprising a liquid proof container about each coil side, said mass of insulating material terminating in an annular ring upon each end of the core and comprising a liquid proof container about the coil heads, said mass of insulating material having duct cooling means therein, said cooling means including a plurality of longitudinal passages through the mass of insulating material in the space bridging the teeth, and intercommunicating means on each end of the core for interconnecting the ends of the said passages, said intercommunicating means comprising a header embedded in the mass of insulating material on one end of the core and a compartment mounted on the other end of the core and making a sealing connection with the insulating material.

FRANK J. SIGMUND.
WILLIAM S. HLAVIN.